Figure 1:
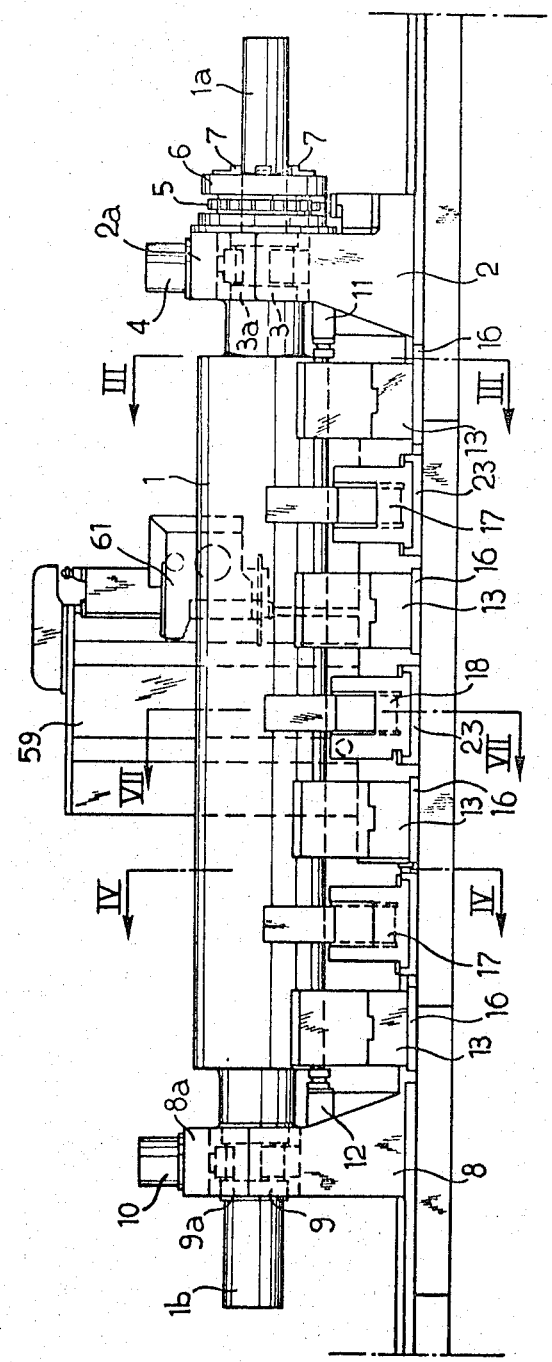

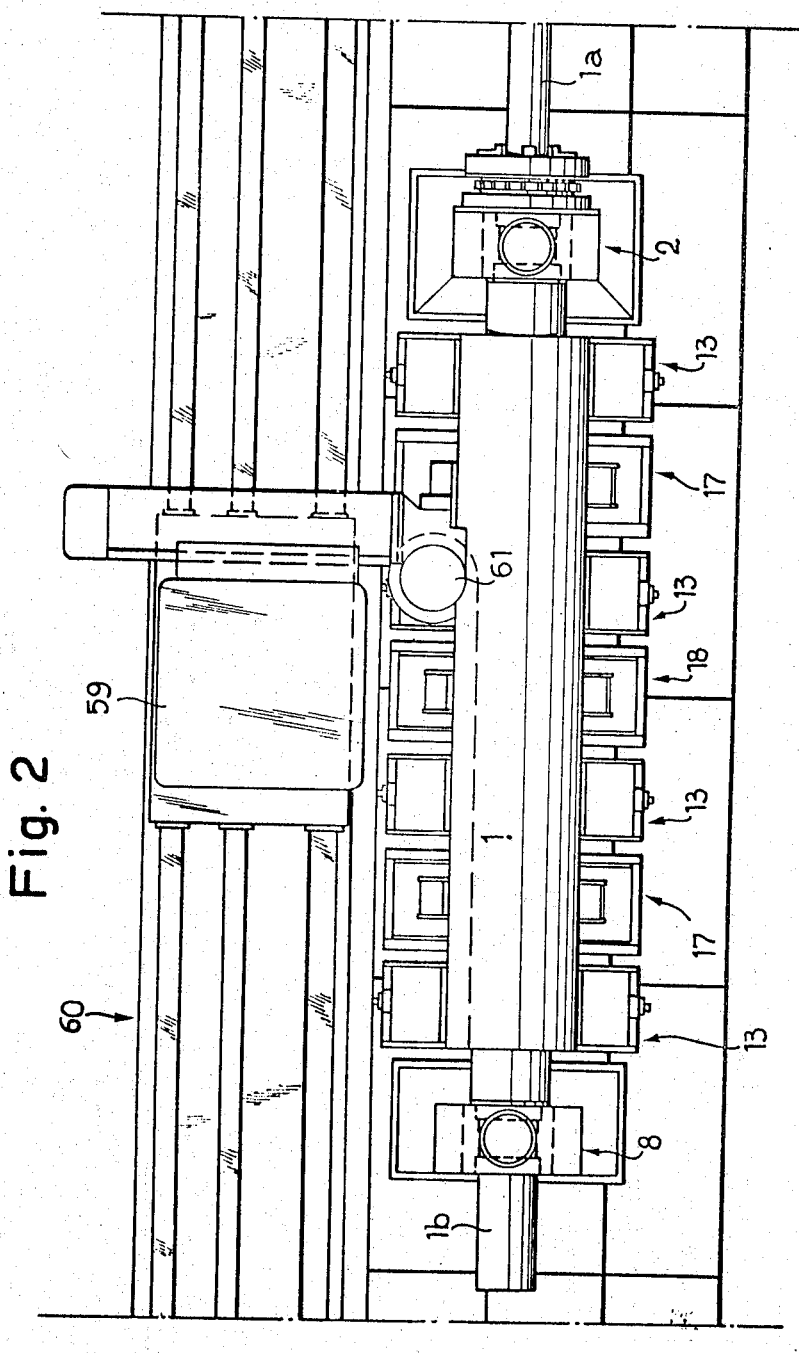

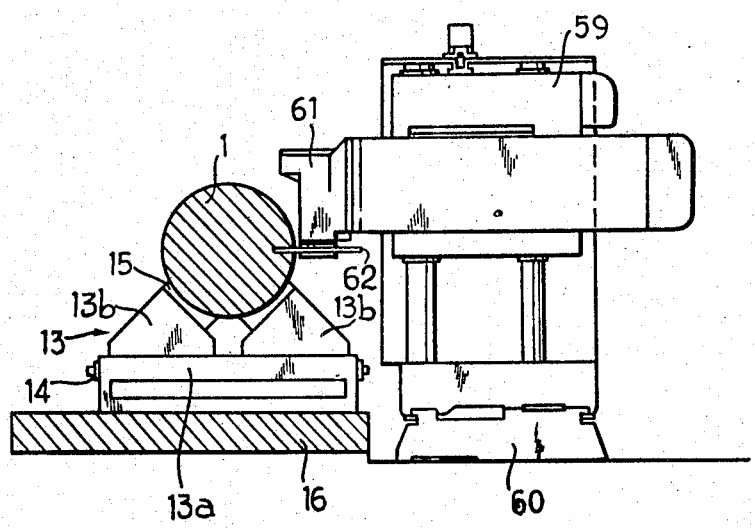

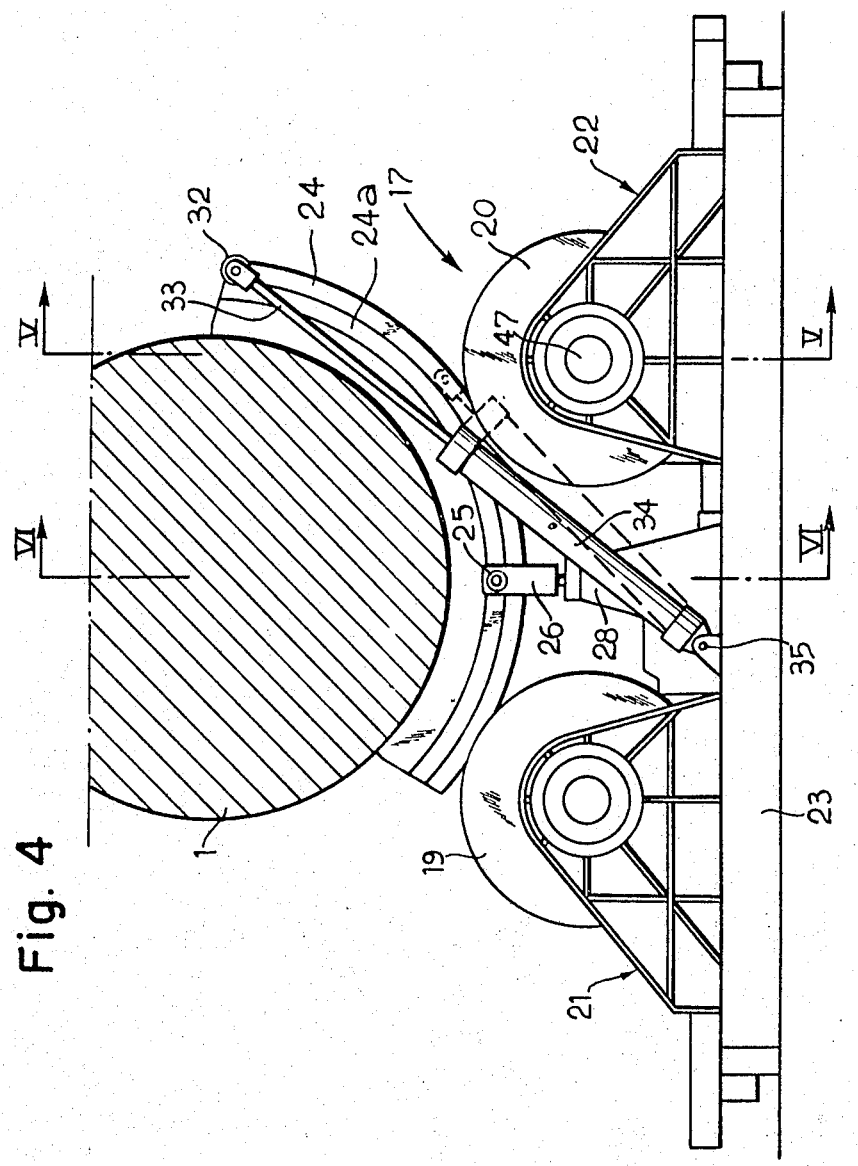

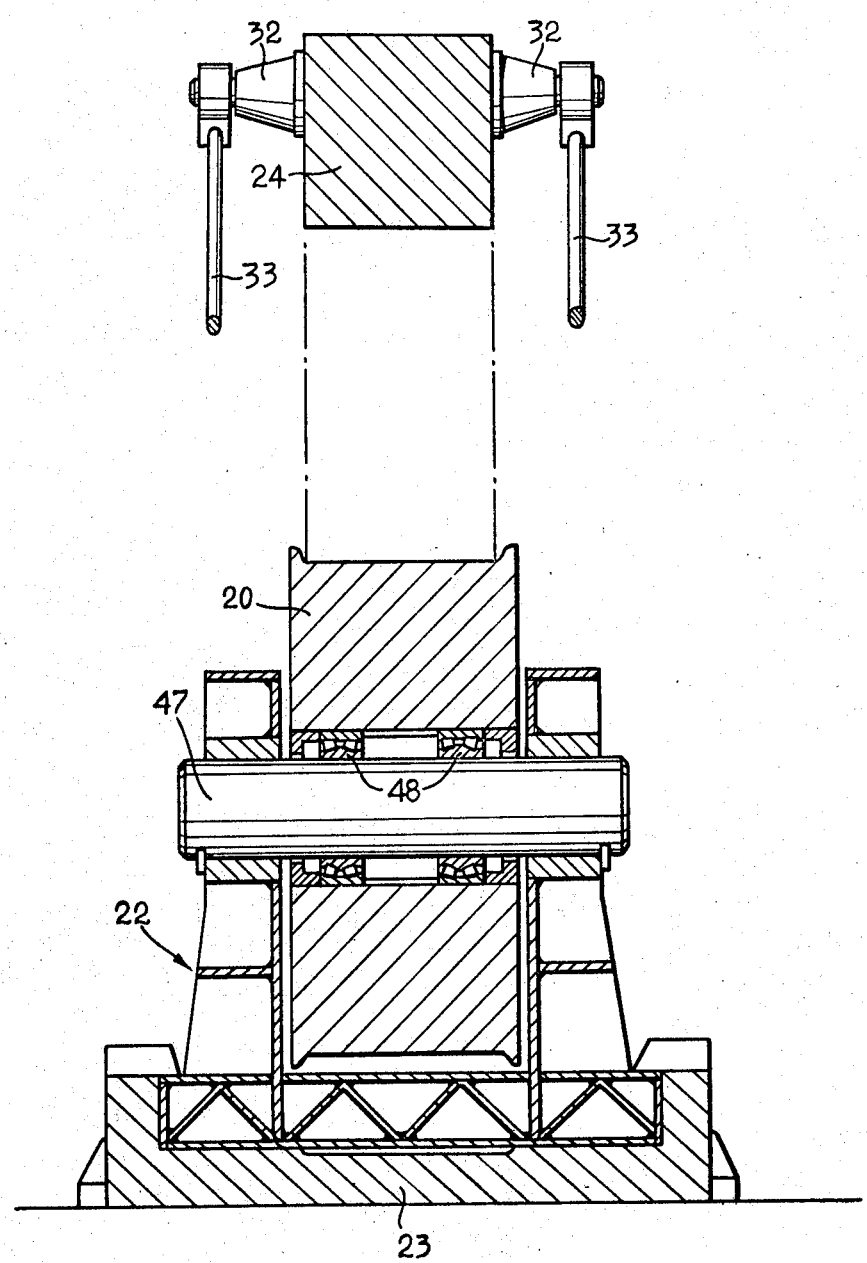

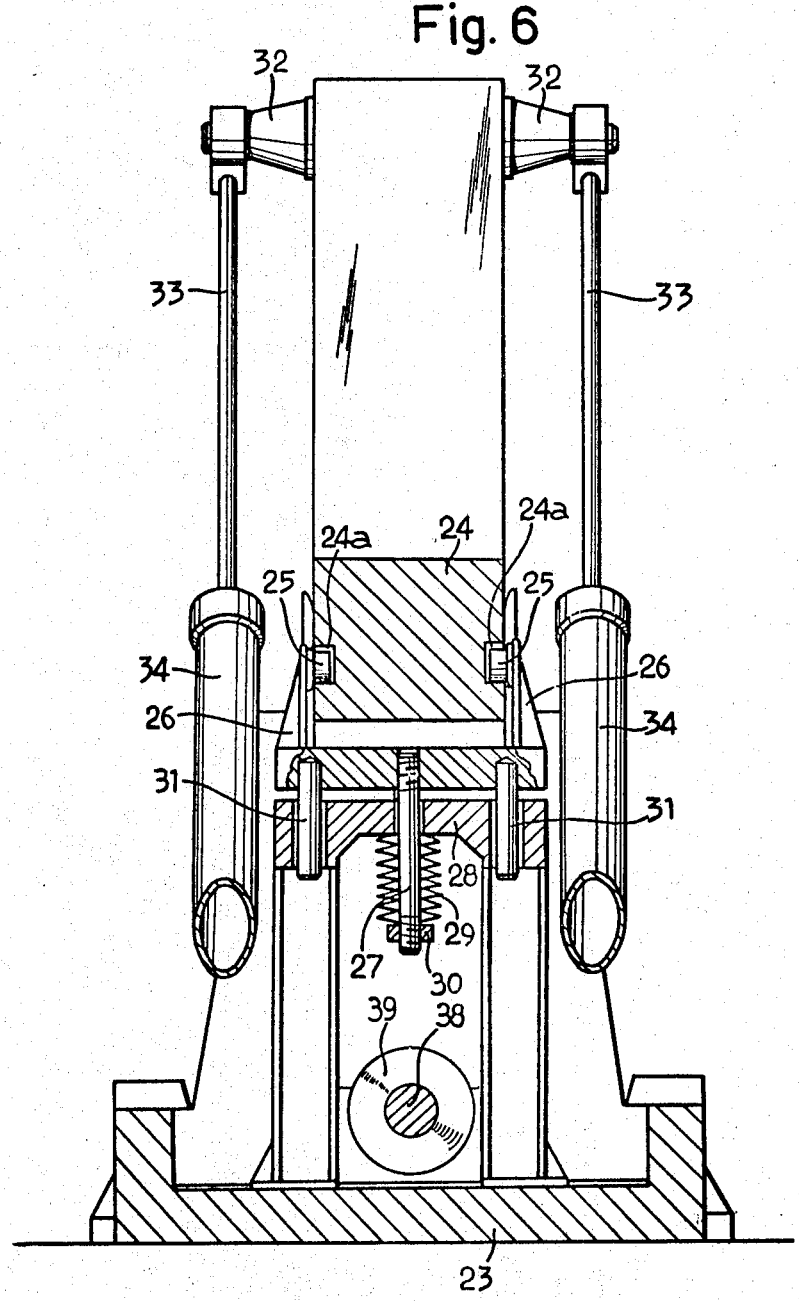

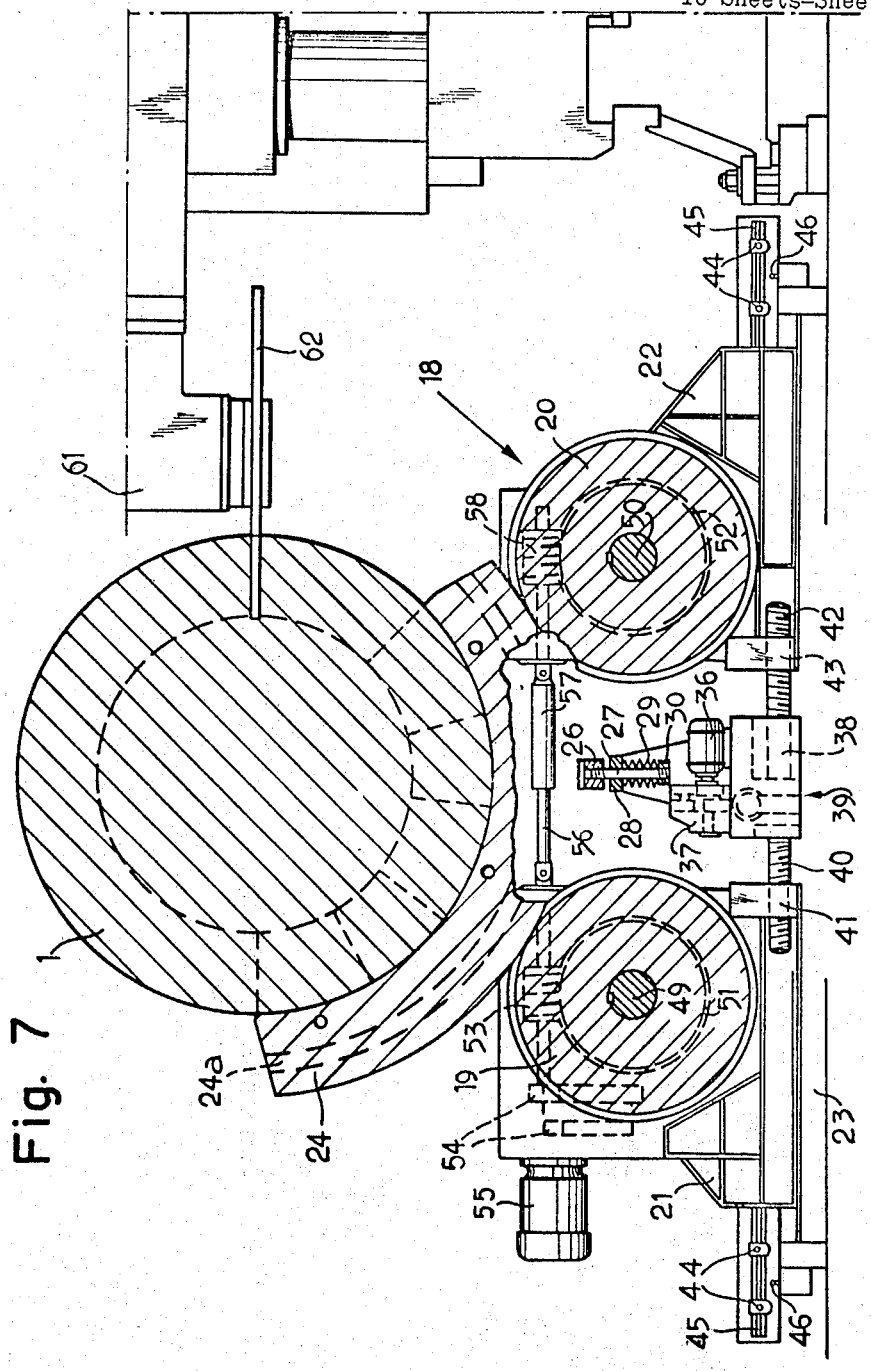

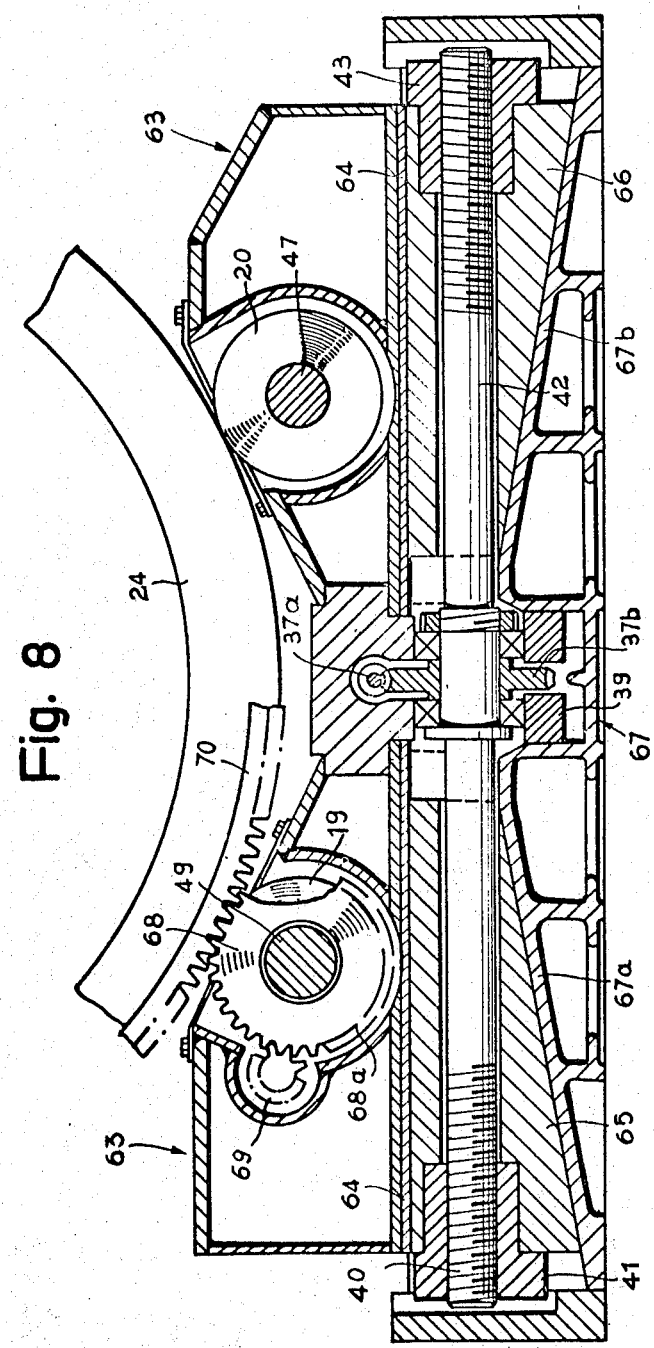

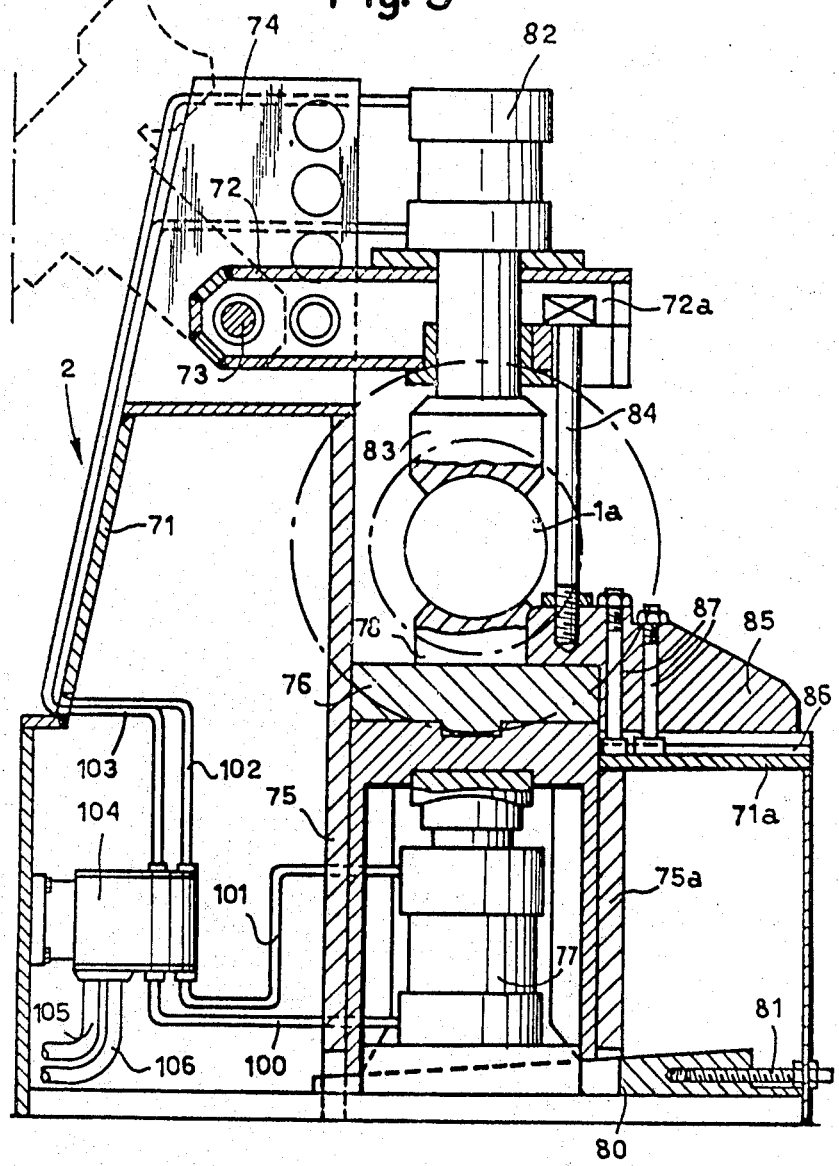

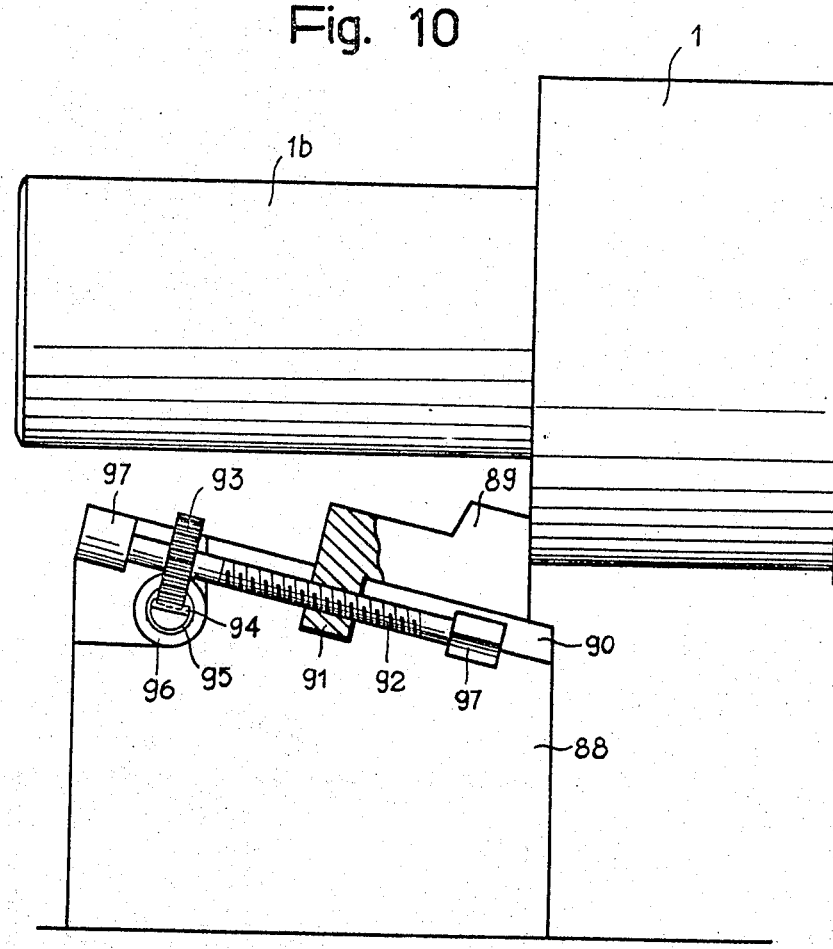

United States Patent Office 3,362,295
Patented Jan. 9, 1968

3,362,295
WORK HOLDER
Maso Galbarini and Francesco Cotta Ramusino, Milan, Italy, assignors to Innocenti Società Generale per l'Industria Metallurgica e Meccanica, Milan, Italy
Filed Dec. 3, 1965, Ser. No. 511,527
Claims priority, application Italy, Dec. 4, 1964, 26,212/64
13 Claims. (Cl. 90—15.1)

This invention relates to a work holder for use for supporting large-sized rotors during longitudinal milling thereof on a milling machine. The invention deals more particularly with work holders used in milling longitudinal slots in large-sized rotors of electric machines.

It is already known to carry out the milling process on milling machines provided with a sliding head moving over horizontal guides arranged parallel to the work which is secured to a bed plate so that its rotational axis extends horizontally. On completion of each milling process the work is rotated about its axis, the extent of rotation being controlled by means of an indexing device.

According to conventional practice the work is supported at both opposite ends, one of which has attached thereto the indexing device.

The work is rotated by means situated at one of its end supports.

With large sized work pieces, such as large rotors of electric machines the above described work holders are objectionable under various aspect, mainly because of deformations due to bending of the work supported at their ends, as well as to torsional deformations occurring when a torque as transmitted to one end of the work piece.

This invention obviates the above drawbacks by providing a work holder for milling slots in large rotors which is simple and tough in construction, and with which the work is supported so that its main axis is kept truly rectilinear.

A further object of this invention is to provide a work holder of the abovementioned type, in which the work is rotated by a simple manipulation, avoiding torsional deformations and protecting at the same time the previously milled slots against mechanical damage.

A further object of this invention is to provide a work holder of the abovementioned type, in which the work is quickly and highly accurately rotated and is subsequently clamping the work without allowing the latter to undergo any angular displacement from its position.

According to this invention there is provided a work holder for milling machines suitable for cutting longitudinal slots in cylindrical bodies of large size rotors having two end trunnions, the machine comprising a horizontal slideway, a tool head carrying upright mounted for movement on said slideway and a horizontal stationary table extending along said slideway, characterized by comprising in combination with two end supports fixed in spaced relationship to the table and adapted to engage said trunnions so that the longitudinal axis of the rotor extends parallel to the slideway, a plurality of intermediate supports fixed to the table in spaced relationship between the end supports, each intermediate support comprising a pair of adjustable shoes adapted to engage the cyclindrical portion of the rotor, during the milling process, and a plurality of cradle supports fixed to the table in the spaces between adjacent intermediate supports, each cradle support comprising a cradle adapted to engage the cylindrical portion of the rotor, means for supporting the cradle rotatably about a horizontal axis coinciding with the rotor axis and means for displacing the cradle in a plane transverse to said horizontal axis of rotation, one at least of said cradle supports being provided with driving means adapted to effect rotation of the cradle about its axis.

Further characteristic features and advantages of this invention will be understood from the detailed description referring to the accompanying drawings which are given by way of illustration.

FIGURE 1 is an elevational side view of a work holder according to this invention,
FIGURE 2 is a plan view,
FIGURE 3 is a cross sectional view on line III—III of FIGURE 1,
FIGURE 4 is a cross sectional view on line IV—IV of FIGURE 1, showing one of the cradle supports,
FIGURE 5 is a longitudinal sectional view on line V—V of FIGURE 4,
FIGURE 6 is a longitudinal sectional view on line VI—VI of FIGURE 4,
FIGURE 7 is a cross sectional view on line VII—VII of FIGURE 1, showing one of the cradle supports provided with means for rotating the work,
FIGURE 8 is a cross sectional view of a cradle support provided with means for rotating the work according to a modification of FIGURE 7,
FIGURE 9 is a cross sectional view of one end support according to a modification of FIGURE 1, and
FIGURE 10 is an axial sectional view showing a detail of FIGURE 1 relating to means for axially retaining the work.

Referring to FIGURES 1, 2 and 3, 1 denotes a large-sized rotor for electric machines, mounted on a work holder of a milling machine for cutting longitudinal slots adapted to receive the electric windings. The milling machine comprises an upright 59 mounted for movement on a slideway 60 and having an adjustable tool head 61 carrying thereon a milling cutter 62.

A fixed table 60a extends along the slideway 60.

The rotor is generally provided with two end trunnions 1a, 1b reduced in diameter, adapted to be engaged by two end supports 2 and 8 of the work holder, which are fixed in spaced relationship to the table 60a to suit the length of the rotor 1 and to maintain the axis of the rotor parallel to the slideway 60.

One end holder 2 is provided with a top cap 2a and carries internally two jaws 3, 3a adapted to engage the trunnion 1a of the rotor allowing rotation of the latter about its axis.

A fluid pressure cylinder 4 is arranged in the cap 2a of the support and clamps the work during milling. An indexing device 5 is arranged externally of the support 2 and is secured to the work end and serves for adjusting the angular displacements of the work.

The device 5 is secured to the trunnion 1a of the rotor by a plurality of clamps 7 carried by a bored platform 6 fitted on the work end.

The other end support 8 is similarly provided with a top cap 8a, two supporting and sliding jaws 9, 9a and a fluid pressure cylinder 10, the said members acting like the equivalent members provided on the other support 2.

Both end supports 2, 8 are provided with abutments 11, 12 for preventing axial movements of the rotor during milling of the slots.

According to an embodiment shown in FIGURE 10 the abutments each comprise a member 89 adapted to abut one end of the rotor 1, to prevent axial movements thereof. Each abutment is mounted for longitudinal displacement on an inclined guide 90 formed on an adjustable plate 88.

The slidable member 89 carries an extension 91 having a nut cooperating with an operating screw 92 supported at its opposite ends by supports 97 and having keyed intermediate its ends a toothed pinion 93.

The pinion cooperates with a rack 94 fast with the piston rod 95 of a fluid pressure cylinder 96.

The work holder according to this invention moreover comprises a plurality of intermediate supports 13 fixed to the table 60a in spaced relationship between the end supports 2, 8, and variable in number in accordance with the length of the rotor to be machined.

As shown in FIGURE 3 each intermediate support 13 comprises a bed plate 13a resting on a bed 16 provided with attachment means (not shown) for fixing to the table 60a and two sliding blocks 13b capable of transverse movement on guides provided on the bed plate 13a under the action of screw-threaded rods 14.

Two supporting shoes 15 are arranged at the upper ends of the sliding blocks 13b and present a concave bearing surface having a radius of curvature equal to the radius of the rotor, the rotor resting on the shoes during milling.

Adjustment in a transverse direction of the sliding blocks by means of the screw-threaded rods 14 serves for horizontally and vertically setting the rotor. The shoes 15 are interchangeable, so that shoes shaped to suit the work can be mounted on the sliding blocks 13b. The work holder according to this invention is moreover provided with cradle supports 17 alternating with the intermediate supports 13, varying in number according to the length of the work to be made.

As shown in FIGURES 4, 5 and 6 each cradle support 17 comprises two rollers 19, 20 rotatably mounted by means of bearings 48 on pins 47 having their axes extending parallel with the rotor axis and supported by two slides 21, 22 mounted for transverse displacement on a bed plate 23, provided with attachment means (not shown) for fixing to the table 60a.

A sector 24 rests on the two rollers 19, 20 and is shaped to match the profile of the rotor 1 and is mounted for rolling over the rollers when the rotor is rotated.

The sector 24 is pressed against the rollers 19, 20 by a fork 26 provided with rollers 25 engaged in two side grooves 24a in the sector, the said fork being provided with a screw-threaded rod 27 engaged by its bottom end in a hole in a bracket 28 fixedly attached to the bed plate 23. The sector is biased by spring means against the supporting rollers 19, 20.

In the embodiment shown the spring means comprise a plurality of disc or cup shaped springs 29 interposed between the bottom face of the bracket 28 and a nut 30 screwed on the end of the screw-threaded rod 27.

Accurate positioning of the fork 26 with respect to the bracket 28 is maintained by two pins 31 fast with one of said members and slidable in suitable guides in the other member.

Two pivots 32 are secured on opposite sides to one end of the sector 24 and have articulated thereto piston rods 33 of two fluid pressure cylinders 34 hinged at 35 by their bottom ends to the bed plate 23 over which the slides 21 and 22 of the cradle support are movable.

The fluid pressure cylinders are adapted to return the sector 24 to its operating position as described hereinafter.

The slides 21, 22 carrying the sector supporting rollers 19, 20 are provided with means for drawing them together and apart in order to raise or lower the rotor 1; said means, which are shown in FIGURE 7 comprise an electric motor 36 driving through a reducing gear 37 an operating screw 38 centrally engaged by a stationary support 39; the two opposite ends 40, 42 of the screw 38 are formed with oppositely handed screw-threaded engaged by two nuts 41, 43 each securedly fixed to one slide 21 and 22 respectively.

By operating the electric motor 36 in either direction the two slides are simultaneously drawn towards or apart from each other in order to vary the position in height of the work. The two slides 21, 22 move over horizontal guides carried by the bed plate 23, their sliding movement being controlled by reference studs 44 slidably mounted on guides 45, as well as by end switches 46. One at least of the cradle supports described above is provided with means for rotating the rollers in order to transmit rotation to the rotor 1 for effecting the angular displacements thereof.

As shown in FIGURES 1 and 2 the cradle support 18 provided with means for transmitting rotation is centrally arranged with respect to the rotor 1 to be milled.

The means for rotating the rollers of the cradle support 18 are shown in FIGURE 7, and comprise an electric motor 55 which operates through a reducing gear 54 two worm screws 53, 58 meshing with two worm wheels 51, 52 keyed to two shafts 49, 50, respectively, securedly fixed to the two rollers 19, 20 of the cradle support 18.

The worm screws 53, 58 are connected by a splined coupling 56, 57 in order to allow to vary the spacing of the rollers 19, 20.

Operation of the device rotating the rollers 19, 20 of the cradle 18 causes the sector 24 to roll over the driving rollers, rotation being transmitted to the rotor 1 bearing on said sector.

The work holder according to this invention operates as follows:

After having axially positioned on the table 60a the end supports 2 and 8, the intermediate supports 13, the cradle supports 17 provided with free rollers and the cradle support 18 provided with driving rollers, in order to arrange the rotor 1 in its proper position with respect to the milling machine in accordance with its length and diameter, the rotor is placed on the work holder so that its end trunnions 1a, 1b are engaged in the supports 2, 8 and its cylindrical portion bears on the shoes of the intermediate supports without contacting the sectors of the cradle supports 17, 18.

The intermediate supports 13 and cradle supports 17, 18 are selected in number and positioned so as to avoid any bending of the rotor.

Then, by simultaneously operating all the cradle supports 17, 18 the rollers 19, 20 are drawn together and effect uniform lifting of the rotor 1 from the shoes 15 of the intermediate supports 13.

During said lifting the upper jaws 3a and 9a of the end supports 2 and 8 are hydraulically lifted to permit vertical displacement of the rotor, the indexing device 5 following the vertical movement of the rotor.

When the rotor has been moved away from the intermediate supports 13, rotation can be effected by the cradle support 18 which rotates its rollers 19, 20.

The rotational speed of the rotor may be automatically or manually reduced to facilitate the desired positioning by gradually reducing the rotational speed of the driving motor 55.

Upon positioning the roller, the slides 21, 22 of the cradle supports 17, 18 are moved away from each other in order to place the rotor back on the shoes 15 of the intermediate supports 13; upon clamping the end portions 1a, 1b of the rotor by the top shoes 3a and 9a of the end supports 2 and 8, the milling of a groove can be effected.

The sectors 24 of the cradle supports each permits rotation of the work through an angle ranging between 45 and 60 degrees. For rotation through wider angles the sectors have to be reset to their initial position, which is effected by drawing apart the rollers 19, 20 of the cradle supports 17, 18 in order to place the rotor 1 back on the intermediate supports 13 and away from the sectors 24.

The rams 34 with which each cradle support is equipped are actuated to return their respective sectors 24 to the initial position by causing them to slide over the outer surface of the rotor.

Subsequently, the rollers 19, 20 are again drawn together to support the rotor on the sectors 24 and permit a further rotation of the rotor 1.

A modified cradle support is shown in FIG. 8 and comprises a rigid frame 63 supporting the two rollers 19, 20, one roller 20 being freely mounted on its pivot 47, the other roller 19 being keyed to a shaft 49 carrying a toothed-wheel 68 having teeth 68a meshing with a driving pinion 69 operated in a known manner by a reducing gear and a motor (not shown).

The teeth 68a mesh also with a curved rack 70 securedly fixed to the sector 24 bearing on the rollers 19 and 20 of the support in order to transmit without slipping rotation from the driving motor to the sector hence to the rotor thereon.

The frame 63 supporting the rollers 19, 20 rests through the interposition of slideways 64 on two wedge-shaped bodies 65, 66 slidably mounted on a bed plate 67 provided with means for fixing to the table 60 and presenting on its upper face two symetrically arranged inclined slideways 67a, 67b, sloping in opposite directions.

The wedge-shaped bodies 65, 66 carry two nuts 41, 43 engaging the ends 40, 42 provided with oppositely handed screw-threads of an operating screw 38 having its middle portion engaged in a stationary support 39. The screw 38 is rotated by a motor through a reducing gear comprising a screw 37a and a worm wheel 37b, to simultaneously move horizontally the two wedge-shaped bodies 65, 66 in opposite diretcions, whereby the frame 63 as well as the rollers 19, 20, sector 24 and rotor 1 are moved vertically.

The driving roller 19 is rotated by a reducing gear moved by direct current variable-speed motors, whereby the rotor can be rotated over a wide range of speeds suitable for fast displacements and slow movements when the indexing device is operated.

After the sectors 24 have been rotated for the full course extending for about 60 degrees, the direct current motor by rotating at a higher speed quickly returns the sectors to their initial position.

The end positions of the sectors and lifting inclines are defined by micro switches.

According to a further embodiment shown in FIGURE 9, the end supports 2, 8 each comprise a base frame 71 and a beam 72 rotatable about a horizontal pivot 73 supported in the top portion 74 of the side walls of the base frame. Rotation of the beam facilitates positioning of the rotor which may be lowered by means of a crane on the end supports 2 and 8.

The base frame 71 has two vertical guideways 75, 75a between which moves a slide, operated by a double acting fluid pressure cylinder 77 having secured thereto a concave jaw 78 for supporting the trunnion 1a or 1b of the rotor.

The tiltable beam 72 has secured thereto a fluid pressure cylinder 82, the piston rod of which has secured thereto a movable jaw 83 similar in shape to the jaw 78.

The tiltable beam 72 is clamped in its engaged position by means of a rod 84 having a head engaged in a groove 72a in the beam and a threaded end screwed to a block 85 transversely slidable on guideways 86 on a horizontal surface 71a of the base frame, the block 85 being secured to the base frame by means of screws 87.

The work chambers of the cylinders 77, 82 are connected by conduits 100, 101 and 102, 103 to a hydraulic distributor 104 having a feed conduit 105 connected to a pump and a discharge conduit 106 terminating in an oil sump. When the trunnions 1a, 1b of the rotor are clamped between jaws 78 and 83, the distributor 104 connects all conduits 100-104 to allow vertical translations of the rotor 1 when it is lifted or lowered by the cradle supports.

On removal of pressure from the bottom cylinder 77 while the top cylinder 82 is fed through conduit 103, the bottom slide 76 moves over its guideways to a bottom stop adjustable in height, comprising a wedge-shaped member 80 capable of transverse movement operated by an operating screw 81.

When the slides 76 of both end supports 2, 8 rest against respective stops 80, the rotor bears on the intermediate supports 13 and is locked in its milling position by the jaws 83 pressed against the trunnions 1a and 1b by the cylinders 82.

It will be obvious from the above that with the work holder according to this invention the rotor can be lifted by simultaneously acting on all cradle supports, whereby any deformation due bending is avoided.

Moreover, as the rotor is rotated either by one centrally situated cradle support with driving rollers or by a plurality of cradle supports spaced between the end supports 2, 8 and all have driving rollers, the torsional deformations are negligible when compared with those which would occur with a large-sized rotor rotated at one of its ends.

By resting on the sectors 24 interposed between the rotor 1 and the supporting rollers 19, 20 the rotor surface and the edges of the already made slots are protected against damage, inasmuch as the sectors rotate together with the rotor and the rotor weight is disturbed over a portion of each sector.

The adoption of two pressure cylinders on the end supports according to the embodiment shown in FIGURE 9 permits to lift the rotor also by means of the bottom cylinders of said supports, in order to supplement lifting effected by the cradle supports. The rotor can be rotated while the bottom jaws of the end supports steadily support the rotor, through the interposition of an oil film between said jaws and the rotor trunnions.

In order to rotate the rotor after each milling process the operation is then as follows.

The top jaws 83 of both end supports are released, the rotor is lifted by operating the cradle supports, preferably with the aid of both bottom cylinders 77 of the end supports, rotation is effected by means of the cradle supports to the desired position, determined by the indexing means, the two opposite cylinders 77, 82 of each end supports are locked hydraulically so that the rotor cannot be displaced from its angular position, but can be placed on the intermediate supports 13 by lowering the cradles, after which the end supports are clamped by admitting pressure to the top working chamber of the cylinder 82 so as to bring the bottom slide 76 against the stationary stop 80 and clamps the trunnions 1a, 1b.

Positioning is effected by means of high-accuracy electric levels arranged at both ends of the rotor, positioned by means of indexing discs at the desired angular position.

The operator may read from his control stand the readings on the two levels and stop the rotation at the desired point.

The provision of the two levels depicts any torsional deformation undergone by the rotor during rotation.

An arrangement of electric contacts is further provided which automatically slows down the rotational speed of the rotor so as to move the rotor automatically with the least possible delay within the reading range of the levels at an angular speed suitable for manual positioning.

What we claim is:

1. Work holder for milling machines suitable for cutting longitudinal slots in cylindrical bodies of large size rotors having two end trunnions, the machine comprising a horizontal slideway, a tool head carrying upright mounted for movement on said slideway and a horizontal stationary table extending along said slideway, characterized by comprising in combination with two end supports fixed in spaced relationship to the table and adapted to engage said trunnions so that the longitudinal axis of the rotor extends parallel to the slideway, a plurality of intermediate supports fixed to the table in spaced relationship between the end supports, each intermediate support comprising a pair of adjustable shoes adapted to engage the cylindrical portion of the rotor, during the milling process, and a plurality of cradle supports fixed to the table in the spaces between adjacent intermediate supports, each cradle support comprising a cradle adapted to engage the cylindrical portion of the rotor, means for supporting the cradle rotatably about a horizontal axis coinciding with the rotor axis and means for displacing the cradle in a plane transverse to said horizontal axis of rotation, one at least of said cradle supports being provided with driving means adapted to effect rotation of the cradle about its axis.

2. Work holder as claimed in claim 1, characterized by the fact that the intermediate supports each comprise a bed plate provided with means for fixing it to the machine table and presenting on its upper face guide means, a pair of blocks being slidably mounted on said guide means, each block being provided at its upper portion with interchangeable shoes shaped in accordance with the diameter of the rotor, each bed plate comprising screw operated means for simultaneously moving said blocks in opposite directions on said guides.

3. Work holder as claimed in claim 1, characterized by the fact that the cradle supports each comprise a bed plate provided with means for fixing it to the machine table and presenting on its upper face guide means, a pair of blocks being slidably mounted on said guide means, each block being provided with a roller mounted on a pin supported by the block transversely of the guide means, the cradle being formed by a circular sector bearing on said rollers, each bed plate comprising screw operated means for simultaneously moving said blocks in opposite directions on said guides.

4. Work holder as claimed in claim 3, characterized by the fact that the sector of each cradle support is resiliently urged against the supporting rollers by a fork provided with rollers engaged in two grooves formed in the opposite faces of the sector, said fork being connected by resilient means to the bed plate.

5. Work holder as claimed in claim 3, characterized by the fact that the cradle supports are each provided with a pair of fluid pressure cylinders hinged at the bottom to the bed plate and having their piston rods hinged to one end of the sector.

6. Work holder as claimed in claim 3, characterized by the fact that the means for simultaneously moving the blocks in opposite directions comprise an electric motor acting through a reducing gear on an operating screw axially engaged by a support fixed to the bed plate, the screw having oppositely hand screw-threads engaged by a nut fixedly secured to each block.

7. Work holder as claimed in claim 1, characterized by the fact that the driving means for rotating the cradle of one at least of the cradle supports comprise an electric motor acting through a reducing gear on two endless screws meshing with two worm wheels keyed to roller supporting shafts the said screws being connected by a splined coupling.

8. Work holder as claimed in claim 1, characterized by the fact that each end support comprises a bottom portion and a top portion each housing a jaw adapted to rotatably support respective trunnion, the top portion of each support housing a fluid pressure cylinder adapted to clamp the top jaw against the trunnion during the milling process, each support being provided with adjustable abutment means arranged horizontally for resisting the axial thrust due to milling of the rotor.

9. Work holder as claimed in claim 1, characterized by the fact that the end supports each comprise a bottom frame and a beam hingedly attached to the frame, clamping means being provided to demountably fix the beam relatively to the frame, the bottom frame and the beam each supporting a double acting fluid pressure cylinder, piston rods of both cylinders being vertically aligned and carry two opposite jaws adapted to clamp the respective trunnion, the working chambers of both cylinders are connectable by means of conduits controlled by a distributor to allow vertical displacements of the trunnions while their rotation is prevented.

10. Work holder as claimed in claim 9, characterized by the fact that the bottom frame of each end support is formed with two vertical guideways over which a slide moves which is fast with the jaw operated by the bottom fluid pressure cylinder, an abutment adjustable in height for said slide being provided at the bottom portion of the frame.

11. Work holder as claimed in claim 1, characterized by the fact that the cradle supports each comprise a bed plate provided with means for fixing it to the table and presenting on its upper face two symmetrically inclined slideways sloping in opposite directions, two wedge-shaped members are slidably mounted on said slideways, a rigid frame is slidably mounted on both wedge-shaped members and presents two rollers mounted on pins supported by the frame and extending transversely of the slideways, the cradle being formed by a sector bearing on said rollers, said wedge-shaped members being operated for displacement in opposite directions on the slideways by screw means comprising a screw rotatably engaged in a support fixed to the bed plate and having its opposite ends provided with oppositely handed screw-threads engaged by nuts fixed to said wedge-shaped members.

12. Work holder as claimed in claim 11, characterized by the fact that one roller of the cradle support is fast with a toothed-wheel meshing with a driving pinion supported by the frame and with a curved rack fast with the sector resting on the rollers.

13. Work holder as claimed in claim 8, characterized by the fact that the abutment means on the end supports each comprises a member slidably supported by the bottom portion of the support and carrying a nut engaged by an operating screw having keyed thereto a toothed-wheel meshing with a rack operated by a fluid pressure cylinder fixed to said bottom portion of the support.

References Cited
UNITED STATES PATENTS 2,718,177   9/1955   Karmann _____ 90—15.1

FRANCIS S. HUSAR, *Primary Examiner.*